(12) United States Patent
Sung et al.

(10) Patent No.: US 7,797,006 B2
(45) Date of Patent: Sep. 14, 2010

(54) METHOD AND SYSTEM FOR GUARANTEEING SEAMLESS SESSION WHEN REPLACING POC TERMINAL IN POC SYSTEM

(75) Inventors: Sang-Kyung Sung, Seoul (KR);
Jea-Hun Han, Suwon-si (KR);
Joon-Goo Park, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1049 days.

(21) Appl. No.: 11/339,649

(22) Filed: Jan. 25, 2006

(65) Prior Publication Data
US 2006/0189340 A1 Aug. 24, 2006

(30) Foreign Application Priority Data
Jan. 26, 2005 (KR) .................. 10-2005-0007287

(51) Int. Cl.
*H04B 7/00* (2006.01)
(52) U.S. Cl. ............... 455/518; 455/519; 455/90.2; 455/416
(58) Field of Classification Search ............... 455/90.2, 455/412.1, 414.1, 518–520; 370/352, 389, 370/338, 328
See application file for complete search history.

(56) References Cited

U.S. PATENT DOCUMENTS

| | | | |
|---|---|---|---|
| 6,477,150 B1 | 11/2002 | Maggenti et al. | |
| 6,915,136 B2 | 7/2005 | Kikuta et al. | |
| 2006/0046758 A1* | 3/2006 | Emami-Nouri et al. | 455/518 |
| 2006/0085545 A1* | 4/2006 | Borella et al. | 709/227 |
| 2006/0270418 A1* | 11/2006 | Hannu et al. | 455/455 |
| 2007/0142073 A1* | 6/2007 | Idnani | 455/518 |
| 2007/0270104 A1* | 11/2007 | Allen et al. | 455/78 |
| 2009/0028146 A1* | 1/2009 | Kleyman et al. | 370/389 |

FOREIGN PATENT DOCUMENTS

| | | |
|---|---|---|
| JP | 2002-209272 | 7/2002 |
| JP | 2003-304251 | 10/2003 |
| KR | 10-2004-0012132 | 2/2004 |
| KR | 10-2004-0093802 | 11/2004 |
| WO | WO 2004/028113 | 4/2004 |

* cited by examiner

*Primary Examiner*—Duc Nguyen
*Assistant Examiner*—Dominic E Rego
(74) *Attorney, Agent, or Firm*—The Farrell Law Firm, LLP (57) ABSTRACT

A method and system for guaranteeing a seamless session when replacing a PoC terminal in a PoC system is provided, in which a currently busy PoC client can be replaced in an existing busy PoC session using a PoC compliant client capable of connecting the PoC session, thereby preventing a transmitted media stream of the running PoC session from being lost when the PoC client is replaced. The method includes transmitting, by an arbitrary PoC user, a message for replacing a terminal from a user terminal to a session management server while maintaining the session; receiving, by the session management server, the replacement request message, and transmitting an INVITE message to a terminal to be replaced, or a target terminal; and receiving, by the target terminal, the INVITE message, and media through an existing session. In a situation where there is a need to replace the PoC terminal according to change of the media for the PoC call, request of mobility, etc. by the PoC user, the user is allowed to make a continuous call. Thus, it is possible to improve QoE of the user and expand the markets for the PoC terminal and its services.

25 Claims, 10 Drawing Sheets

REFER sip:conf_uri_cfx@example.domain.com SIP/2.0 — P1
Via:SIP/2.0/UDP client_apc.domain.com;branch=z9hG4bK776sgdkse
From:<sip:poc_client_a@example.domain.com>;tag=49583 — P2
To:<sip:conf_uri_cfx@example.domain.com>
Call_ID:asd88asd77a@client_apc.domain.com
CSeq:1239930 REFER
Max-Forwards:70
Contact:<sip:poc_client_a@domain.com>;mobility="fixed";
Refer-To:<sip:poc_client_a@domain.com>;mobility="mobile";video:explicit — P3
;methods="INVITE"
Referred-By:<sip:poc_client_a@domain.com> — P4
;cid="20398823.2UWQFN309shb3@domain.com"
Content-Type:multipart/mixed;boundary=unique-boundary-1
Content-Length:(appropriate)

--unique-boundary-1
Content-Type:multipart/mixed
Content-ID:<20398823.2UWQFN309shb3@domain.com>
Content-Length:(appropriate value)

Replaces:88upf11a@client_apc.domain.com;to-tag=7743;from-tag=6472 — P5
Content-Disposition:arrachment;handling=required --unique-boundary-1--

FIG. 7

```
INVITE sip:poc_client_a@domain.com SIP/2.0                                    — Q1
Via:SIP/2.0/UDP poc_server.domain.com;branch=z9hG4bK776afwjrb
From:<sip:conf_uri_cfx@example.domain.com>;tag=152342                         — Q2
To:<sip:poc_client_a@domain.com>
Call-ID:asd88652tad@poc_server.domain.com
Accept_Contact:*;vidio;mobility="mobile";expliciit                            — Q3
CSeq:45 INVITE
Max-Forwards:70
Contact:sip:conf_uri_cfx@example.domain.com>
Replaces:88upf11a@clientL_apc.domain.com;to-tag=7743;from-tag=6472            — Q4
Content-Type:multipart/mixed;boundary=boundary-1
Content-Length:(appropriate value)

--boundary-1

--boundary-1--
```

FIG. 9

```
REFER sip:poc_client_a@domain.com SIP/2.0                                    ┐ R1
Via:SIP/2.0/UDP client_apc.domain.com;branch=z9hG4bK776sgdkse
From:<sip:poc_client_a@domain.com>;tag=49583                                 ┐ R2
To:<sip:poc_client_a@domain.com>
Call_ID:asd88asd77a@client_apc.domain.com
CSeq:1239930 REFER
Max-Forwards:70
Contact:<sip:poc_client_a@domain.com>;mobility="fixed";                      ┐ R3
Accept-Contact:*;mobilty="mobile";video;explicit                             ┐ R4
Refer-To:<sip:conf_uri_cfx@domain.com>;methods="INVITE"                      ┐ R5
Referred-By:<sip:poc_client_a@domain.com>                                    ┐ R6
 ;cid="20398823.2UWQFN309shb3@domain.com"
Content-Type:multipart/mixed;boundary=unique-boundary-1
Content-Length:(appropriate value)
--unique-boundary-1
Content_Type:multipart/mixed
Content-ID:<20398823.2UWQFN309shb3@domain.com>
Content-Length:(appropriate value)
Replaces:88upf11a@client_apc.domain.com;to-tag=7743;from-tag=6472
Content-Disposition:attachment;handling=required
--unique-boundary-1--
```

FIG. 10

INVITE sip:conf_uri_cfx@domain.com SIP/2.0   — T1
Via:SIP/2.0/UDP client_apc.domain.com;branch=z9hG4bK73jikh2ew
From:<sip:poc_client_a@domain.com>;tag=152342   — T2
To:<sip:conf_uri_cfx@domain.com>
Call-ID:5132265 7829@client_apc.domain.com
CSeq:45 INVITE
Max-Forwards:70
Contact:<sip:conf_uri_cfx@example.domain.com>;mobility="mobile";   — T3
video;explicit
Replaces:88upf11a@client_apc.domain.com;to-tag=77432;from-tag=6472   — T4
Content-Length:(appropriate value)

--boundary-2

--boundary-2--

METHOD AND SYSTEM FOR GUARANTEEING SEAMLESS SESSION WHEN REPLACING POC TERMINAL IN POC SYSTEM

CLAIM OF PRIORITY

This application claims all benefits accruing under 35 U.S.C. §119 from an application for METHOD AND SYSTEM FOR GUARANTEEING SEAMLESS SESSION WHEN REPLACING PoC TERMINAL IN PoC SYSTEM filed in the Korean Intellectual Property Office on Jan. 26, 2005 and assigned Serial No. 2005-7287, contents of which are incorporated herein by reference.

BACKGROUND OF THE INVENTION

1. Field of the Invention

The present invention relates to a method and system for guaranteeing a seamless session when replacing a push-to-talk-over-cellular (PoC) terminal in a PoC system, capable of replacing the PoC terminal without loss of a media stream for a running PoC group session when the PoC terminal is replaced for a specified purpose.

2. Description of the Related Art

Due to significant development of mobile communications technology and extension of mobile communications networks, various extra services and applications which make use of a cellular phone are being provided. At the same time, demand among cellular phone users for various extra services, such as a location service, a multimedia service, and a push-to-talk (PTT) service, is increasing. Among these extra services, the PTT service supports various supplementary functions such as an instant messenger function and a status display function, as well as a group call and a voice call which are also provided by an existing radio or a trunk radio system (TRS).

Figure 1:
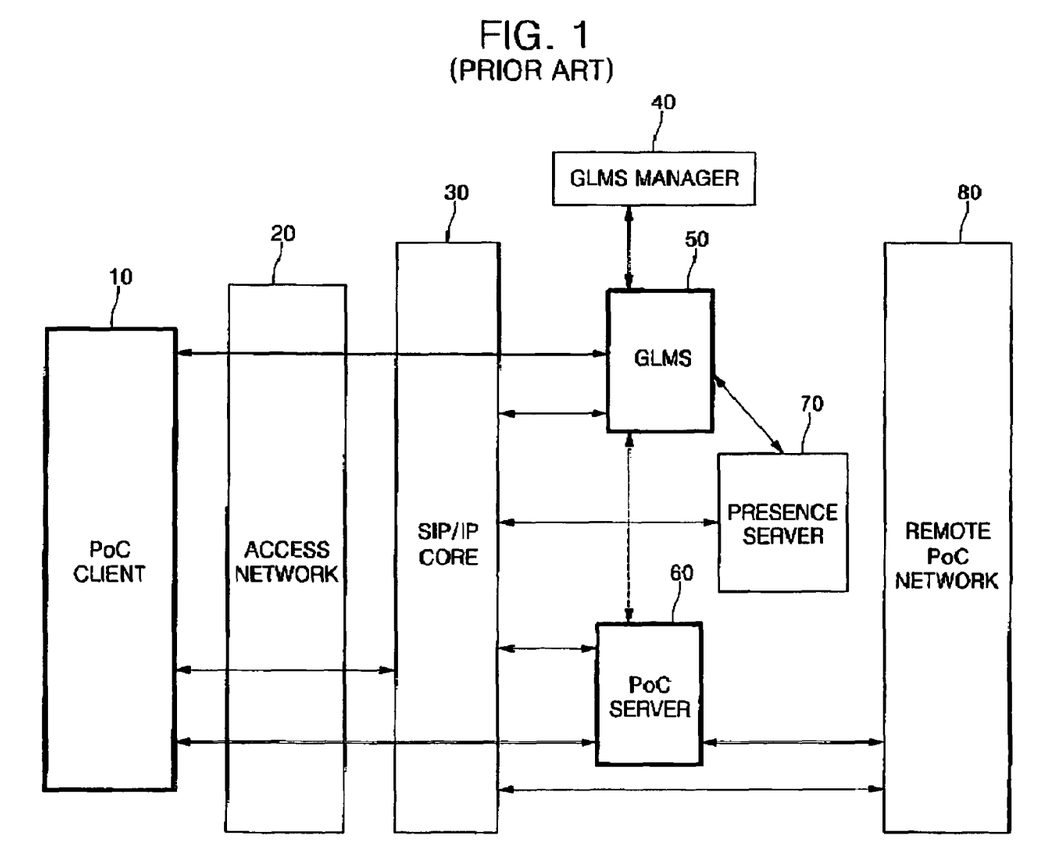
FIG. 1 is a schematic diagram illustrating a conventional PoC service system.

Currently, standardization of a push-to-talk-over-cellular (PoC) service which employs the PTT function in a mobile communication network is actively proceeding. One unique feature of the PoC service is that a user can participate in a plurality of PoC sessions, and can move among the PoC sessions to use a call service. Requirements that the user should move among the plurality of PoC sessions to use the call service are specified in the Open Mobile Alliance (OMA) which is a forum for specifying mobile communications services. The structure of an ordinary PoC service system will be explained below with reference to FIG. 1, which is a schematic diagram illustrating a conventional PoC service system. Referring to FIG. 1, a PoC client 10, as a service requester installed in a mobile station, is connected to a Session Initiation Protocol/Internet Protocol (SIP/IP) core network 30 which supports SIP and IP multimedia functions via an access network 20.

The PoC client 10 resides in a PoC user terminal to provide access to the PoC service. The PoC client 10 serves to establish a PoC session, participate in a PoC session that is currently proceeding, and terminate a PoC session. In addition, the PoC client 10 acts to make and transfer a talk burst, support an instant personal alert, and perform authentication when accessing the PoC service. Hereinafter, unless otherwise stated, both the PoC user and the PoC client 10 are assumed to be the same as a PoC service subscriber.

The SIP/IP core network 30 is connected to a PoC server 60, a GLMS (Group List and Management System) 50, and a presence server 70 in order to support the PoC service.

Generally, SIP is a standard defined in IETF (Internet Engineering Task Force) RFC (Request for Comments) 2543. SIP is an application-layer control protocol that is used to set up, modify and terminate a session or call for multimedia communication such as video and voice. SIP is a protocol that exists over an UDP (User Datagram Protocol)/TCP/IP layer, which supports both unicast and multicast sessions so as to be able to initiate the session by inviting participants to a multimedia conference with a client/server protocol capable of transceiving SIP Request and Response messages in a request/response fashion.

A SIP Request message provides six functions in RFC 2543 as follows: INVITE (Invitation to participate in a session), ACK (Permission to an INVITE request), BYE (Termination of a call), REGISTER (Registration with a redirect server by a user agent), CANCEL (Cancellation of a pending request), and OPTIONS. The SIP Response message provides status codes as follows: 1xx (Informational response), 2xx (Success response), 3xx (Redirection response), 4xx (Client Error, Request Failure), 5xx (Server Error), and 6xx (Global Failure).

The PoC server 60 serves as a Controlling PoC Function (CF) for maintaining and managing a PoC session, or a Participating PoC Function (PF) for participating in a PoC session for a one-to-one PoC call or a one-to-many PoC call (or group PoC call).

Figure 2:
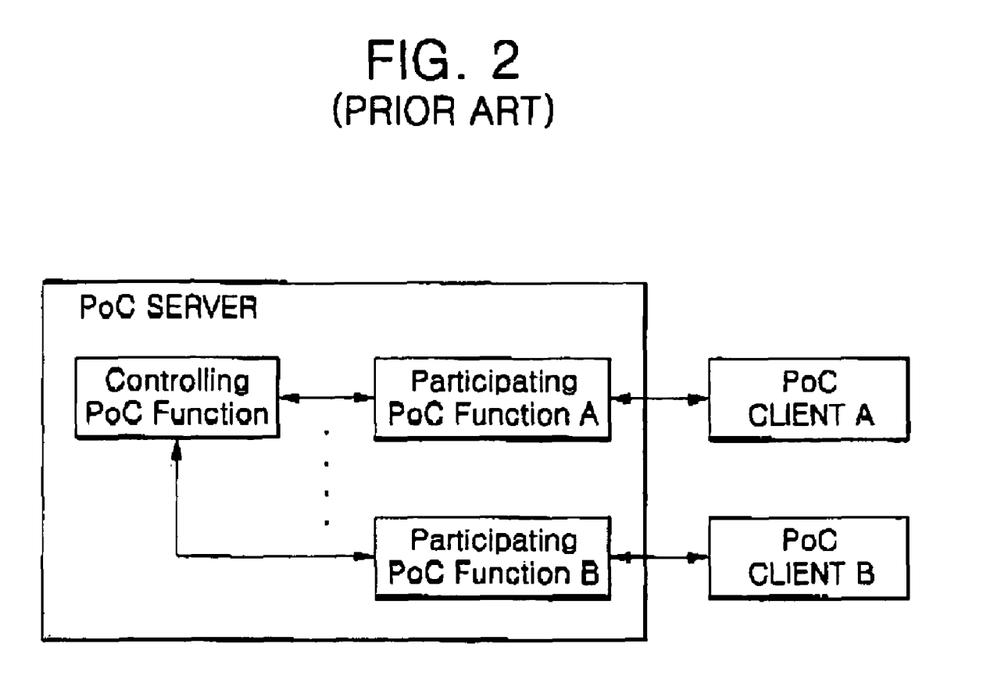
FIG. 2 is a schematic diagram illustrating the structure of a conventional PoC server.

Functional blocks of the PoC server will be explained below with reference to the schematic diagram of FIG. 2.

The PoC server is classified into a Controlling PoC Function of taking charge of overall maintenance and management of a PoC session and a Participating PoC Function (PF) of taking charge of maintenance and management between each PoC session, which will be explained below with reference to relevant tables.

TABLE 1

| Controlling PoC Function (CF) |
| --- |
| Provides centralized PoC session handling |
| Provides centralized Media distribution |
| Provides centralized Talk Burst Arbitration functionality including talker identification |
| Provides SIP session handling, such as SIP session origination, termination, etc. |
| Provides policy enforcement for participation in group sessions |
| Provides participant information |
| Collects and provides centralized media quality information |
| Provides centralized charging reports |
| May provide transcoding between different codecs |
| Supports Talk Burst Control Protocol Negotiation |

As shown in Table 1, the CF serves to maintain and manage a PoC session on the whole. The PoC server receives requests for a floor from PoC clients, arranges an order in which to give the clients the floor, and gives the clients the floor in that order. The PoC server also distributes a talk burst, for which an arbitrary PoC client makes a request, to all other PoC clients participating in a group PoC call, and provides information of the PoC clients participating in the group PoC call.

As shown in Table 2 below, the PF manages a PoC session between the CF and each PoC client. In particular, the PF acts to relay the floor between the PoC client and the CF when the PoC client makes a request for the floor or when the CF gives the floor to the PoC client. In addition, the PF serves to relay media between the CF and the PoC client, perform transcoding between different codecs, and filter one of two concurrent PoC sessions according to the choice of a PoC user when there is simultaneous talking in the two concurrent PoC sessions.

TABLE 2

Participating PoC Function (PF)

Provides PoC session handling
May provide the Media relay function between PoC client and Controlling PoC server
May provide user media adaptation procedures
May provide the Talk Burst control message relay function between PoC client and Controlling PoC server
Provides SIP session handling, such as SIP session origination, termination, etc, on behalf of the represented PoC client
Provides policy enforcement for incoming PoC session (e.g. access control, incoming PoC session barring, availability status, etc.)
May collect and provide media quality information
Provides the participant charging reports
May provide filtering of the media streams in the case of simultaneous sessions
May provide transcoding between different codecs
May support Talk Burst Control Protocol Negotiation
Stores the current Answer Mode and Incoming PoC Session Barring preferences of the PoC client In the PoC service system as described above, the PoC user can input information on a group and its members to the GLMS 50 through his/her PoC terminal, and can be aware of information about PoC users who he or she can call through an individual or group list transmitted from the GLMS 50. Alternatively, the information on the group and its members may be input, corrected and managed in the GLMS 50 via a reliable communication network such as the Internet or Intranet which a PoC service provider can trust.

In order to make use of the PoC service, the PoC user registers his/her PoC address with the SIP/IP core network 30. The SIP/IP core network 30 stores PoC user information at the request of the PoC user. Thus, when another PoC user tries to request a group PoC call, the PoC user registers his/her information in the SIP/IP core network 30 in advance as described above, and requests the group PoC call to his/her SIP/IP core network 30 by using group identification information transmitted from the GLMS 50. At this time, the SIP/IP core network 30 performs address determination and domain location determination by using information of the call requesting PoC user and then transfers a PoC call request to a home PoC server 60 with which the call requesting PoC user is registered. In regard to the PoC call request, the PoC 60 server prepares for establishment of a PoC session, obtains each user's information from the GLMS 50, and then transfers a PoC call request signal to a corresponding SIP/IP core network 30. Here, in the case of a PoC call request to users within an Intradomain, the PoC server 60 performs both the CF and PF. The PoC server 60, which manages a call-requested PoC user, requests a PoC call to the PoC user after the SIP/IP core network 30 performs the location determination procedure, by using information of the PoC user that is transmitted to the PoC server 60.

Figure 3:
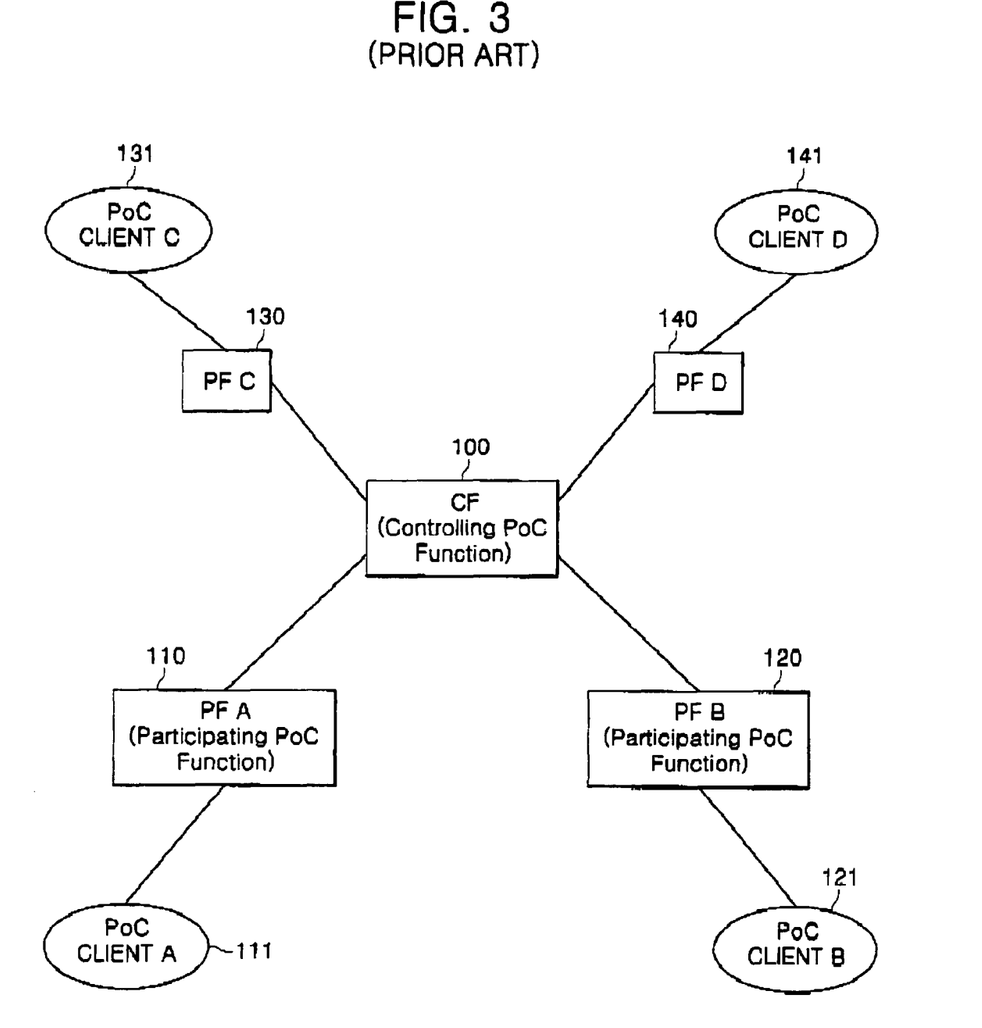
FIG. 3 is a schematic diagram illustrating CF and PF blocks of a PoC server.

FIG. 3 is a schematic diagram illustrating CF and PF blocks of a PoC server.

Referring to FIG. 3, PoC clients 111, 121, 131 and 141 provide access to a CF 100 through PFs 110, 120, 130 and 140 respectively, thereby establishing a PoC session. Here, when a floor is granted to a requester qualified as a talker from the CF 100, media based on speaking of the corresponding PoC client is transmitted to each PoC client.

First, in order to describe in full detail a session connecting procedure, etc. of a PoC client in a terminal, the following features of the PoC system defined in the OMA will be discussed. The PoC system according to setup of the originating and terminating sides of the PoC session in the OMA has the following features.

The PoC system is divided into two types, an on-demand session mode and a pre-established (or early) session mode, according to how the connection with a PoC server 60 in the home network of a user is set up.

The pre-established session mode means that the PoC user sets up a specified session between the PoC client and the PoC server 60 within his/her home network in advance by his/her request. The pre-established session is necessary to enable the PoC user to negotiate media parameters to be used with the PoC server 60 in advance, and thus perform rapid call setup without negotiating again the media parameters to be used in the future between the server and the client. In order to establish the early session, the PoC client provides media parameters supported to a SDP (Session Description Protocol) body through an SIP INVITE method, and responds to media parameters provided from the server. The PoC client returns identification information of the early session which is newly set up for a response message to the PoC user including a conference URI (Uniform Resource Identifier). In the case of using the early session, it is possible to set up an IP address, a port number, a codec to be used, a talk burst control protocol, etc., in advance.

The on-demand session mode refers to a state where the PoC user does not set up the early session, and means that the PoC user performs a PoC call connecting procedure after receiving an INVITE message of another PoC user.

Meanwhile, the PoC system makes a half-duplex group PoC call possible, including the above features. This multilateral conferencing function is an exemplary feature of the PoC system, and may be divided into an ad hoc PoC group, a pre-arranged PoC group, and a chat PoC group according to the feature of a group that is set up.

In the PoC system having the foregoing features, the respective elements such as the PoC client, PoC server, SIP/IP core network, group list server, presence server, and so on, as well as procedures of initiating and connecting an initial PoC session through signaling between these elements can be found from the OMA standard draft as the conventional SIP-based technology, and so their description will be omitted.

Meanwhile, in the conventional PoC system having the foregoing features, there may occur situations where a PoC client participating in a currently proceeding PoC session should be replaced.

As concrete examples of this situation, in a first situation, a currently participating PoC session has a feature of supporting not only a voice, but there is a need to replace media, such as a video, including the voice as a call is made. In this case, some PoC users using a voice support terminal have to replace their own PoC client with video support terminal.

In a second situation, power of a currently used terminal is almost consumed, but there is a need to continuously participate in a current PoC session without termination.

In a third situation, a user is participating in a PoC session using a stationary PoC terminal (e.g. a VoIP terminal) at his/her office, but feels a need to move. In this case, there is a need to connect a currently participating session using his/her mobile wireless terminal (mobile PoC terminal).

In addition to these examples, a need to replace the PoC terminal by a special request of the user may frequently occur.

With respect to this requirement, a conventional process of replacing a PoC session on the basis of OMA PoC 1 standard technology will be described with reference to the flow diagram of FIG. 4.

Figure 4:
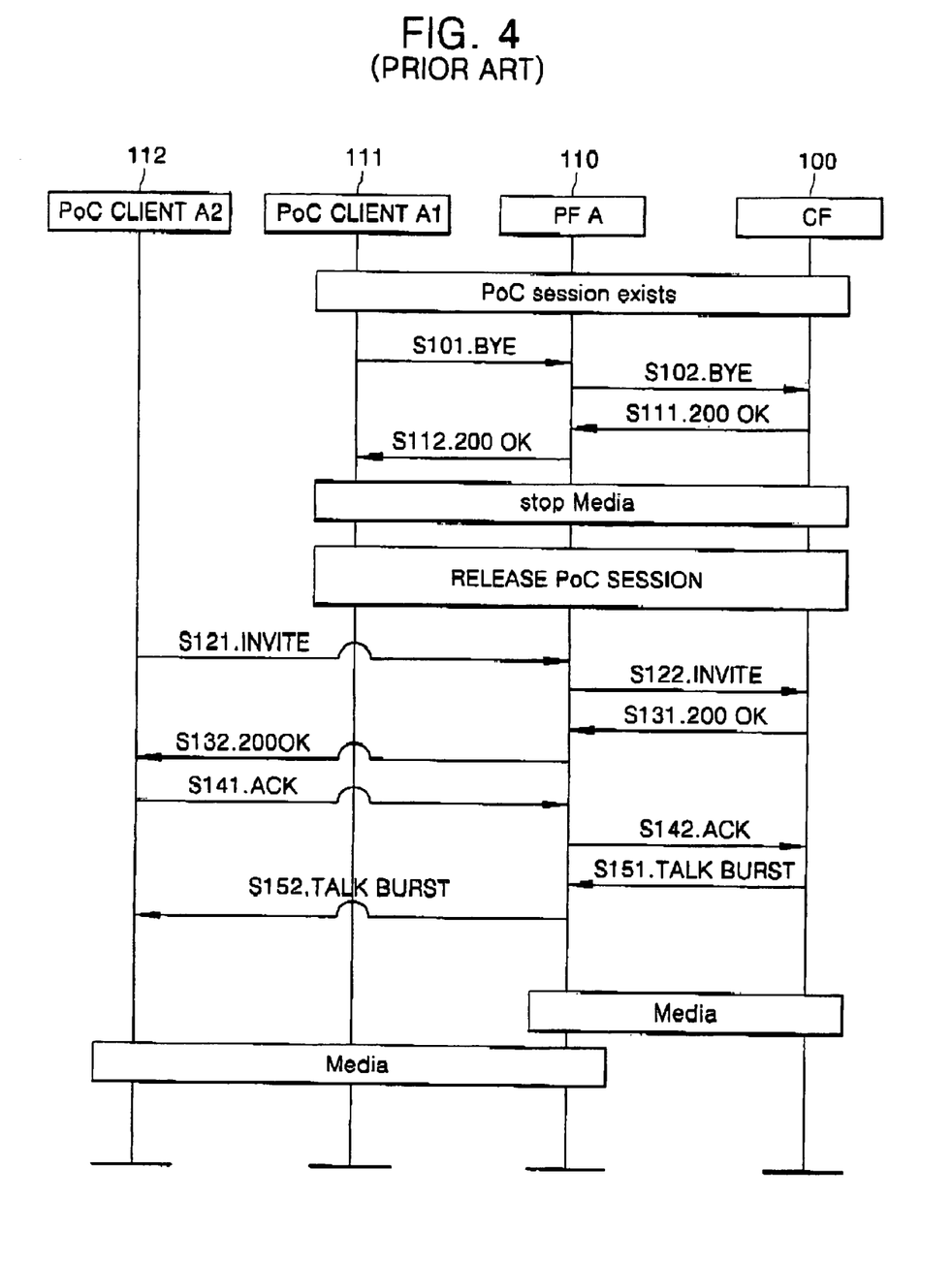
FIG. 4 is a flow diagram showing a conventional process of changing a PoC session in order to replace a PoC terminal.

FIG. 4 shows a process where a PoC client A1 111, as a terminal that has already participated in a running session, attempts to participate in a running session using a PoC client A2 112 by request of a user.

First, a PoC client A1 111 transmits an SIP BYE message to a PF A 110 of his/her home network in order to terminate a participating PoC session (S101), and thus the PF A 110 transmits the BYE message to a CF 100 through information on an SIP address contained in the BYE message (S102).

Next, after receiving the session BYE message, the CF 100 transmits a 200 OK response signal for terminating a PoC conference (S111 and S112), thereby releasing the PoC client A1 111 and stopping transmitting media at the same time.

Meanwhile, a PoC user who terminates the session transmits an INVITE message to the PF A 110 via the PoC client A2 112 in order to participate again in the previous session using a new PoC client (S121). The INVITE message is transmitted through the PF A 110 to the CF 100 having control over the running conference session (S122). At this time, the PoC client A2 112 must have unique identity information of the PoC session (session ID) in order to participate the proceeding PoC session again.

Next, the CF 100 transmits a 200 OK response (S131 and S132), thereby allowing the new PoC client A2 112 to participate in the session, receives an ACK signal (S141 and S142), and confirms the participation of the session. Simultaneously, the CF 100 transmits a corresponding floor message to the PoC client A2 112 according to a floor in the current session. When another PoC client transfers media, the CF 100 transmits a Floor Taken message to the PoC client A2 112 using RTCP (Real-time Transport Control Protocol) (S151 and S152).

Thereafter, when the session is connected, the CF 100 transmits media to the PoC client A2 112 using an RTP (Real-time Transport Protocol).

The foregoing conventional process has the following problems.

First, when the PoC user participates again in the same PoC conference session in which he/she participates as the PoC client A1 using the PoC client A2, he/she must have the PoC session identity. However, the PoC session identity, that is generated arbitrarily as in an ad hoc session, should be transmitted to the PoC client A2 by manual input of the user.

Further, the PoC client A2 cannot make use of SIP session dialog information which the previous PoC client A1 is putting to use. As such, the PoC client A2 fails to receive a media stream using a session dialog that has been already used.

Therefore, there is a possibility that the QoE (Quality of Experience) of the user will deteriorate because the PoC client A2 fails to receive the media stream of the PoC session while replacing the terminal of the PoC client.

SUMMARY OF THE INVENTION

It is an objective of the present invention to provide a method and system for guaranteeing a seamless session when replacing a PoC terminal in a PoC system, in which address information of a PoC terminal to be replaced and session identity information are transmitted to a server or a PoC client that makes a request to replace the PoC terminal before the session is terminated, thereby replacing only the PoC terminal without loss of a running media stream.

According to an aspect of the present invention, there is provided a method for guaranteeing a seamless session when replacing a push-to-talk-over-cellular (PoC) terminal in a PoC system. The method includes transmitting, by a PoC client requesting replacement of a PoC terminal, a terminal replacement request message for the replacement of the PoC terminal to a session management server while maintaining the seamless session; receiving, by the session management server, the replacement request message, and transmitting an INVITE message to a PoC client to be replaced; and receiving, by the terminal replacement target PoC client, the INVITE message, and media through an existing session.

According to another aspect of the present invention, there is provided a method for guaranteeing a seamless session when replacing a push-to-talk-over-cellular (PoC) terminal in a PoC system. The method includes transmitting, by a PoC client requesting replacement of a PoC terminal, a terminal replacement request message for the replacement of the PoC terminal to a PoC client to be replaced while maintaining the seamless session; receiving, by the terminal replacement target PoC client, the terminal replacement request message, and transmitting an INVITE message including information on an existing session to a session management server; and transmitting, by the session management server receiving the INVITE message, media to the terminal replacement target PoC client.

According to yet another aspect of the present invention, there is provided a push-to-talk-over-cellular (PoC) system for guaranteeing a seamless session when replacing a push-to-talk-over-cellular (PoC) terminal. The PoC system includes a terminal replacement requesting PoC client that makes a request to replace a PoC terminal; a terminal replacement target PoC client that becomes a replacement target of the PoC terminal; and a session management server that receives a terminal replacement request message from the terminal replacement requesting PoC client, transmits an INVITE message to the terminal replacement target PoC client with reference to information on the terminal replacement target PoC client included in the terminal replacement request message, and transmits media to the terminal replacement target PoC client while maintaining an existing session.

According to still yet another aspect of the present invention, there is provided a push-to-talk-over-cellular (PoC) system for guaranteeing a seamless session when replacing a PoC terminal. The PoC system includes a terminal replacement requesting PoC client that makes a request to replace a PoC terminal; a terminal replacement target PoC client that receives a terminal replacement request message from the terminal replacement requesting PoC client, refers to information on an existing session, and transmits an INVITE message including the existing session information; and a session management server that receives the INVITE message, and transmits media to the terminal replacement target PoC client while maintaining the existing session.

According to still yet another aspect of the present invention, there is provided a push-to-talk-over-cellular (PoC) terminal for maintaining a seamless session when the PoC terminal is replaced in a PoC system, which transmits to a session management server a terminal replacement request message including a session identity and information on a PoC terminal to be replaced, and receives a session termination message to terminate the session when a process of replacing the terminal is terminated by the session management server.

According to still yet another aspect of the present invention, there is provided a push-to-talk-over-cellular (PoC) terminal for maintaining a seamless session when the PoC terminal is replaced in a PoC system, which directly transmits a terminal replacement request message, that includes a session identity and information on a PoC terminal to be replaced, to the replacement target PoC terminal through a SIP/IP core network, and receives a session termination message from a session management server to terminate the session.

According to still yet another aspect of the present invention, there is provided a push-to-talk-over-cellular (PoC) terminal for maintaining a seamless session when the PoC terminal is replaced in a PoC system, which receives a terminal replacement request message from a replacement requesting PoC terminal, transmitting an INVITE message to a session management server according to information on an existing session received from the replacement requesting PoC terminal, and receives media from the session management server.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF PREFERRED EMBODIMENTS

Hereinafter, preferred embodiments of the present invention will be described more fully with reference to the accompanying drawings so as enable those skilled in the art to easily implement the present invention.

The following description will be made with respect to application services of a push-to-talk-over-cellular (PoC) system that enables an immediate call according to a call request using IMS (IP Multimedia System) Core Network (CN) that is being standardized or completed in the 3GPP (3rd Generation Partnership Project) or 3GPP2 ((3rd Generation Partnership Project 2), as well as a half duplex type call, a group of users and presence information.

The present invention is constructed on the basis of at least one PoC client and PoC server (PF and CF) defined in an OMA PoC release 1 system, and an SIP and its extension protocol. The basic construction is the same as a general PoC basic structure of FIG. 1, and so its description will be omitted.

Figure 5:
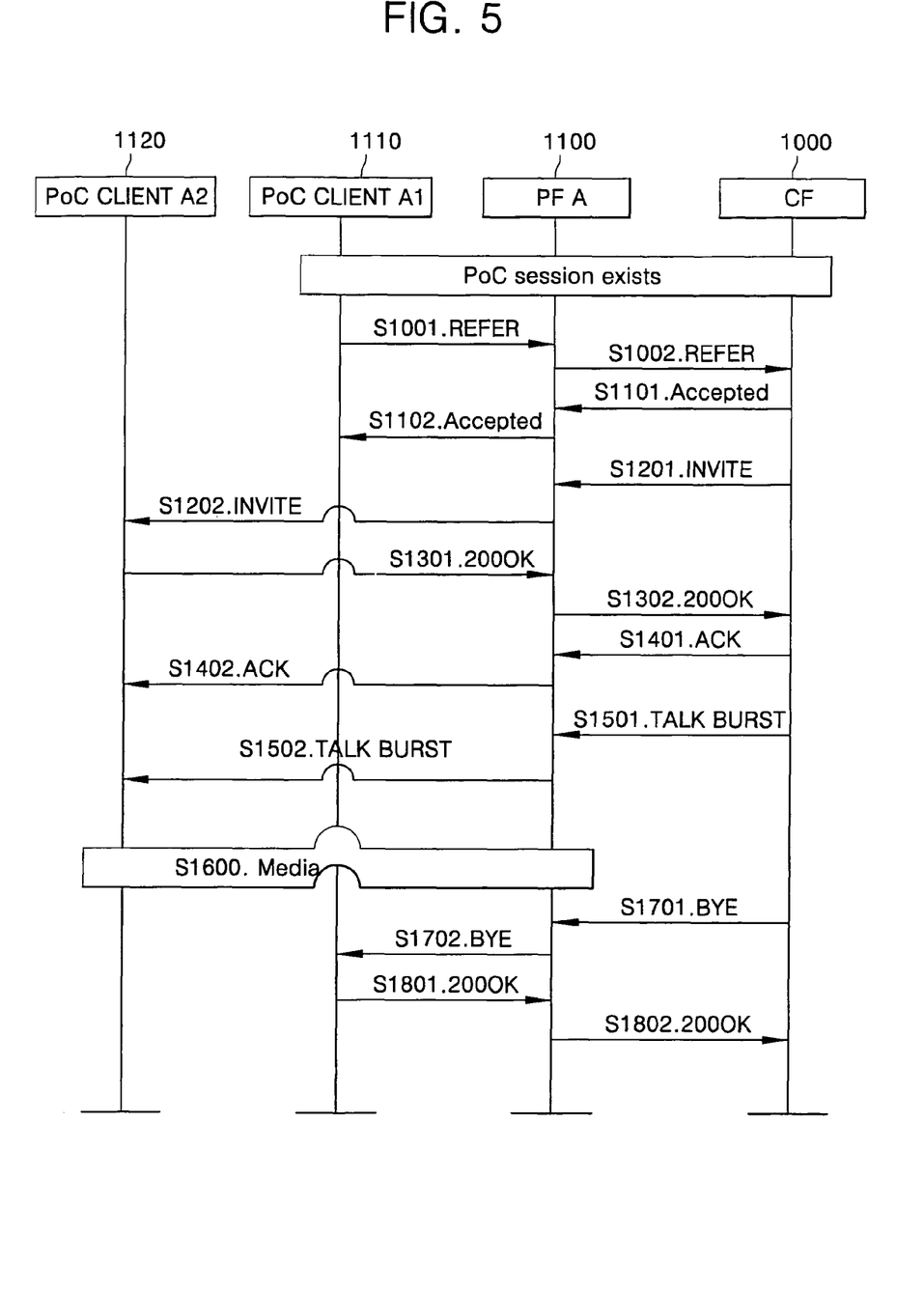
FIG. 5 is a flow diagram showing a process for busy change of a PoC compliant terminal in accordance with a first embodiment of the present invention.

FIG. 5 is a flow diagram showing a process for busy change of a PoC compliant terminal in accordance with a first embodiment of the present invention, where, when a PoC user wants to replace only a terminal without terminating a session, and thus selects a terminal which he/she wants to replace, the resulting information is transmitted to a server, and the terminal is replaced by the server.

Referring to FIG. 5, a PoC client A1 1110 is connected with a PF A 1100 that is the PoC server of a home network, thereby having a session pre-established with a CF 1000 having control over a group session. At this time, the PoC client A1 1110 stores a PoC session identity received through participation in the session, as well as session dialog information (dialog identifier) which is obtained through an INVITE message and its 200 OK response message, and designated between the PoC client A1 and the PoC server.

The dialog identifier is a global identifier, and is composed of a From tag, a To tag and a Call-ID of the SIP INVITE message.

The PoC client A1 1110 storing such information creates an SIP REFER message, and transmits it to the session management PoC server, the CF 1000 (S1001 and S1002). Here, when transmitting the SIP REFER message, the PoC client A1 1110 sets up a unique identity of the PoC session (conference URI:conf_uri_cfx, which is generally managed by the CF) as a Request URI of the REFER message, and sets up address information of the PoC client, which a user wants to use, to Refer-To header information.

Figure 6:
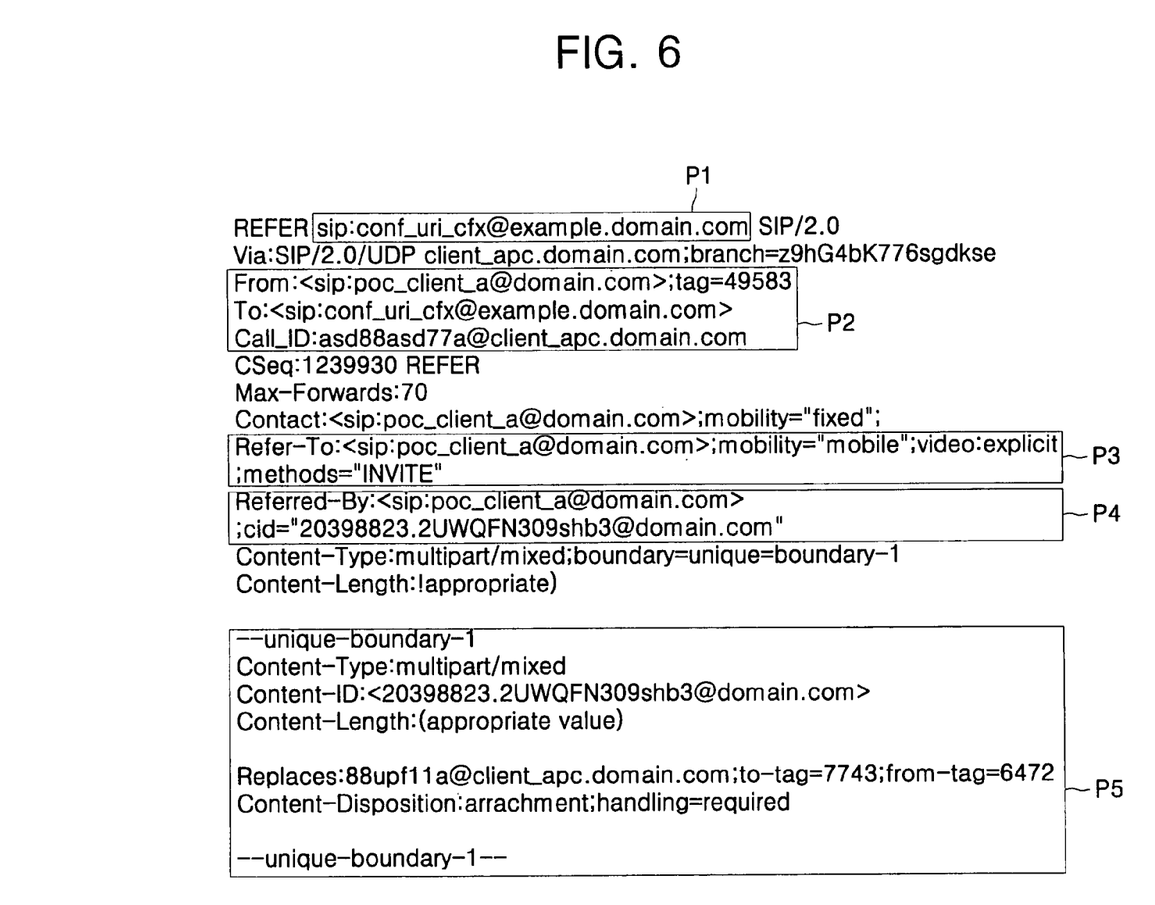
FIG. 6 shows the format of a REFER message used in the process of FIG. 5.

FIG. 6 shows the format of a REFER message used in the process of FIG. 5. As shown in FIG. 6, a Refer-To header field P3 includes a proper SIP message method which is to be taken as address information of a destination.

In the present invention, the INVITE message is transmitted when the session is established. The information on the INVITE message will be described after description of the information of the REFER message.

Address information of a target terminal (a terminal to be changed to) included in the Refer-To header field P3 may be an SIP URI of which a current PoC client A1 makes use, or another SIP URI.

If the same SIP URI is used, a new SIP message is adapted to be transmitted to the PoC client A2 1120, including preference information (characteristic value: mobile, video, or explicit) of an SIP user agent, which is consistent with capability of the SIP user agent of the PoC client A2 1120 in order to discriminate between a target PoC client A2 1120 to be changed to and the current PoC client A1 1110.

Meanwhile, the REFER message includes session connection information (session dialog identifier) (From-tag, To-tag and Call-ID in P2 of FIG. 6) which makes it possible to seamlessly receive content of the currently running PoC session using the target PoC client A2 1120, and information on the target terminal (Refer-To in P3 of FIG. 6).

The CF 1000 as PoC server obtaining the REFER message responds with an Accepted message in order to return successful SIP processing (S1011 and S1102).

Then, the CF transmits an INVITE message to an address of the SIP URI (conf_uri_cfx in P1 of FIG. 6) received through the REFER message (S1201 and S1202).

Figure 7:
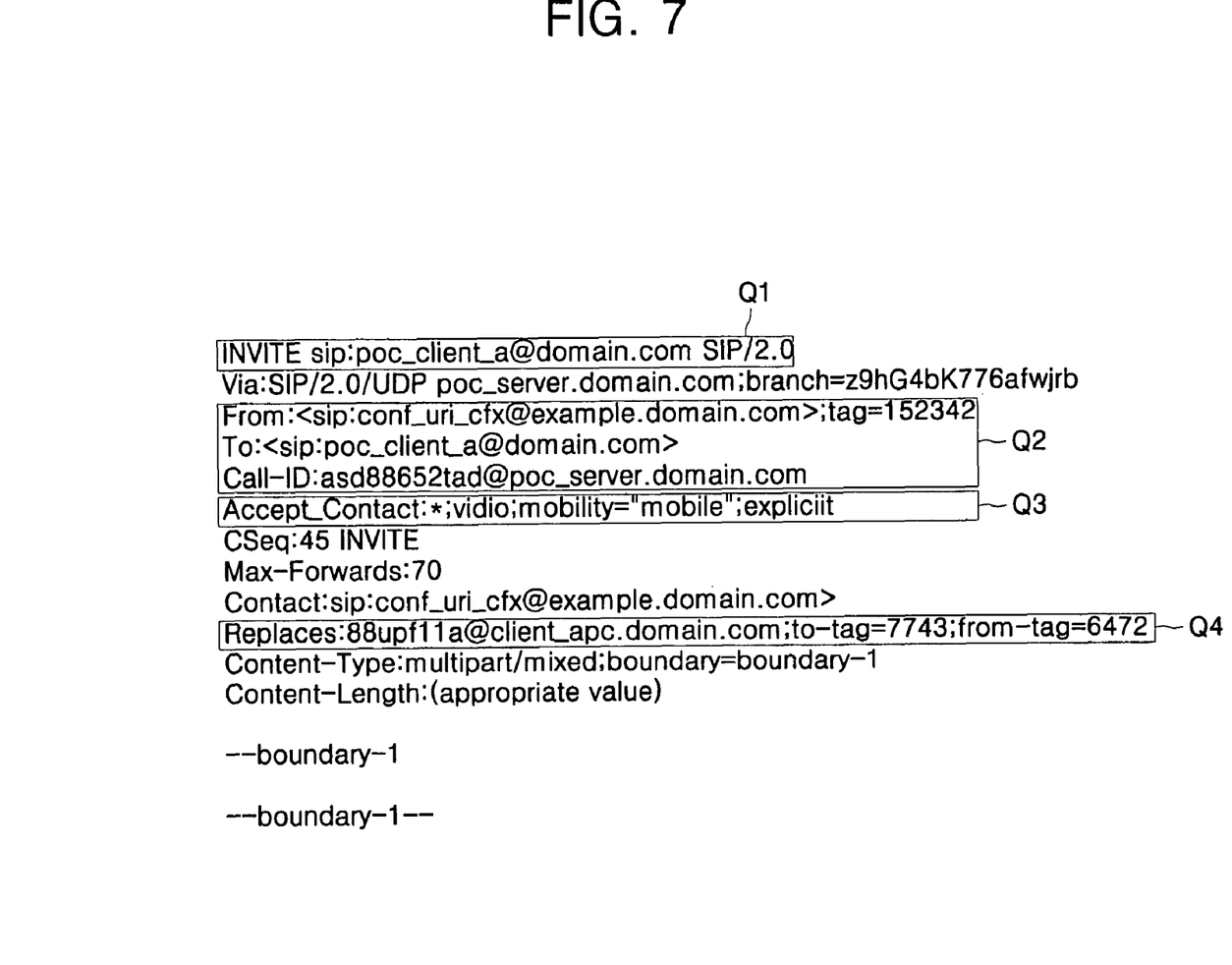
FIG. 7 shows the format of an INVITE message used in the process of FIG. 5.

FIG. 7 shows the format of an INVITE message used in the process of FIG. 5.

As shown in FIG. 7, a session request is adapted to be transmitted to the PoC client A2 1120 with preference information (Q3 of FIG. 7) of the user agent, which is set up by request of the user, included in the INVITE message.

Further, the CF 1000 recognizes an indicator replacing the PoC client A1 1110 with the same dialog. To the end, the CF 1000 transmits information on a session dialog (to be replaced in order to receive media through the same session dialog with respect to the currently running session) through a Replaces header field (Q4 of FIG. 7) of the INVITE message.

Next, the INVITE message routed to the PF A 1100 according to corresponding address information (SIP URI) (conf_uri_cfx) is transmitted to an SIP/IP core network. The SIP/IP core network routes the INVITE message to the corresponding PoC client A2 1120 according to a client characteristic value (Fixed, mobile, video etc.) of the user agent which the PoC client A2 1120 registers using an SIP REGISTER message, and information (Q3 of FIG. 7) included in an Accept-Contact header field.

Then, the PoC client A2 1120 returns a 200 OK response to the CF 1000 according to a response of the user (S1301 and S1302). At this time, newly created session dialog information (dialog ID created by transaction in steps S1201 to S1302) is transmitted to the CF 1000. Thereby, the PoC server, the CF 1000, replaces the previous dialog with the newly created dialog, and transmits media.

When the CF 1000 receives the 200 OK response, the CF 1000 managing a conference returns an ACK signal to the PoC client A2 1120 (S1401 and S1402). Simultaneously, the CF 1000 decides to transmit the media transmitted to the PoC session to a newly connected PoC client A2 1120, and transmits a talk burst control message that notifies the decision (S1501 and S1502).

Further, a media stream in the session is transmitted to the new PoC client A2 1120 after the 200 OK response is received (S1600). At this time, the media is transmitted up to the PF A 1100 through the same route, and is routed to the corresponding PoC client A2 1120 via the SIP/IP core network.

Meanwhile, the PoC server, the CF 1000, receiving the 200 OK message transmits a BYE message for terminating the session to the PoC client A1 1110 in order to terminate unnecessary connection of the session (S1701 and S1702), and confirms the termination of the session by receiving the 200 OK response (S1801 and S1802).

Now, a second embodiment of replacing a terminal will be described, in which the terminal to be replaced continues a session, acting as a subject.

Figure 8:
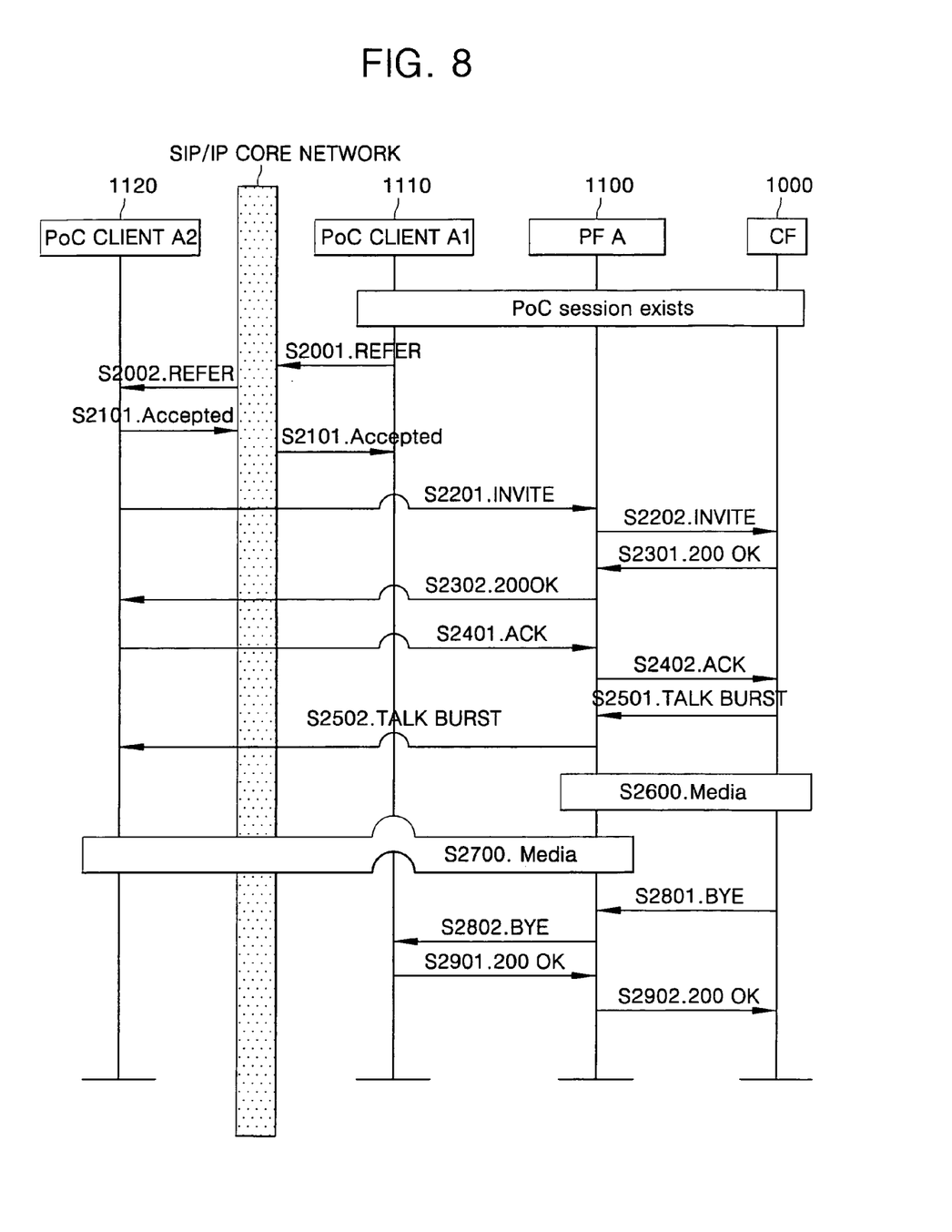
FIG. 8 is a flow diagram showing a process for busy change of a PoC compliant terminal in accordance with a second embodiment of the present invention.

FIG. 8 is a flow diagram showing a process for busy change of a PoC compliant terminal in accordance with a second embodiment of the present invention.

FIG. 8 shows a process where, when a PoC user wants to replace only a terminal without terminating a session, information on a currently running session is transmitted to a terminal to be replaced, and replacement of the terminal is carried out by the terminal to be replaced.

Referring to FIG. 8, in the same situation as the first embodiment of FIG. 5, a PoC client A1 1110 transmits information (conference URI, dialog ID, etc.) of his/her session and information indicating replacement of a PoC session to a corresponding client A2 1120 through a REFER message. At this time, information included in the REFER message is similar to that of FIG. 6, but has the following difference.

The PoC client A1 1110 creates an SIP REFER message, and then the REFER message is transmitted to the PoC client A2 1120 that wants to replace the session through routing of SIP/IP core network (S2001 and S2002). Here, since the REFER message is forwarded through a general SIP proxy server, it has no alternative to pass through a PF A 1100.

To this end, when the SIP REFER message is created, the PoC client A1 1110 sets up a unique identity of the PoC session (conference URI:conf_uri_cfx, which is generally stored in a CF) as the value of a Refer-To header field, and sets up address information of the PoC client, which a user wants to use, as the value of a Request URI.

Description will be made about content of the REFER message with reference to FIG. 9.

The Refer-To header field R5 includes a proper SIP message method which is to be taken as address information of a destination. In the present invention, the SIP message method is adapted to establish the session by designating as an INVITE message.

In the present invention, the SIP message method is designated as the INVITE message when the session is established, and the information on the INVITE message will be described after description of the information of the REFER message.

Address information included in the Request URI may make use of an SIP URI used by the current PoC client A1 or another SIP URI.

Like the description of FIG. 5, if the same SIP URI is used, a new SIP INVITE message is adapted to be transmitted to the PoC client A2 1120, including preference information (characteristic value: mobile, video, or explicit) of an SIP user agent, which is consistent with the capability of the SIP user agent of the PoC client A2 1120 in order to discriminate between a target PoC client A2 1120 and the current PoC client A1 1110. The new SIP INVITE message is transmitted including the preference information in an Accepted-Contact header field (R4 of FIG. 9) of the REFER message, thereby being routed to the PoC client A2 1120 in the SIP/IP core network.

Figure 9:
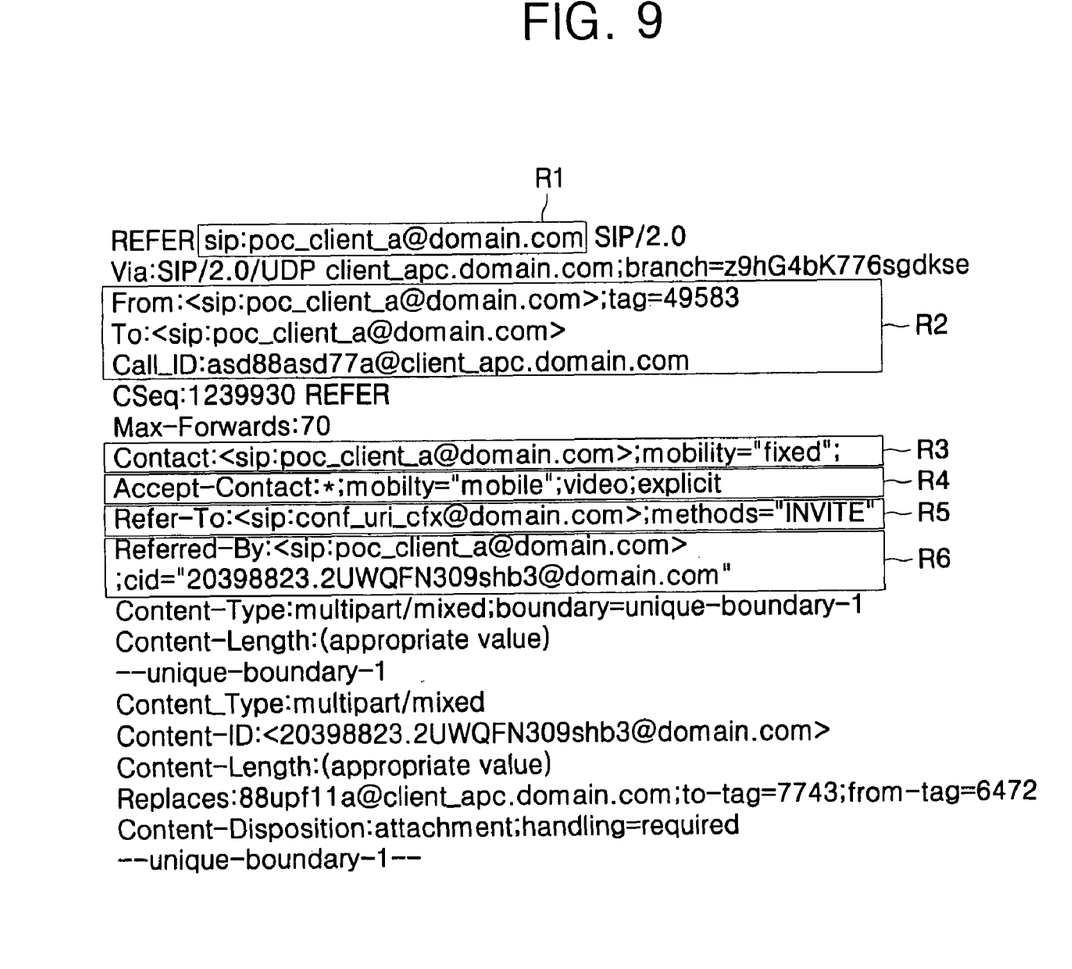
FIG. 9 shows the format of a REFER message used in the process of FIG. 8.

Meanwhile, the REFER message includes connection information of the session (the session dialog identifier) (From-tag, To-tag and Call-ID in R2 of FIG. 9) which enables the currently running PoC session to be seamlessly connected using the PoC client A2 1120, as well as information on the target terminal to be replaced (Refer-To in R5 of FIG. 9).

Further, the REFER message includes a Referred-By header R6 and a Multipurpose Internet Mail Extension type (MIME) body portion containing the corresponding contents in order to transmit dialog information that the PoC client A1 1110 is putting to use.

The PoC client A2 1120 receiving the REFER message responds with an Accepted message in order to return successful SIP process (S2101 and S2102).

Then, the PoC client A2 1120 transmits an INVITE message to an address of the SIP URI (conference URI of the PoC session) received through the Refer-To header of the REFER message (S2201 and S2202).

Information on the INVITE message transmitted at this time will be described with reference to FIG. 10.

Figure 10:
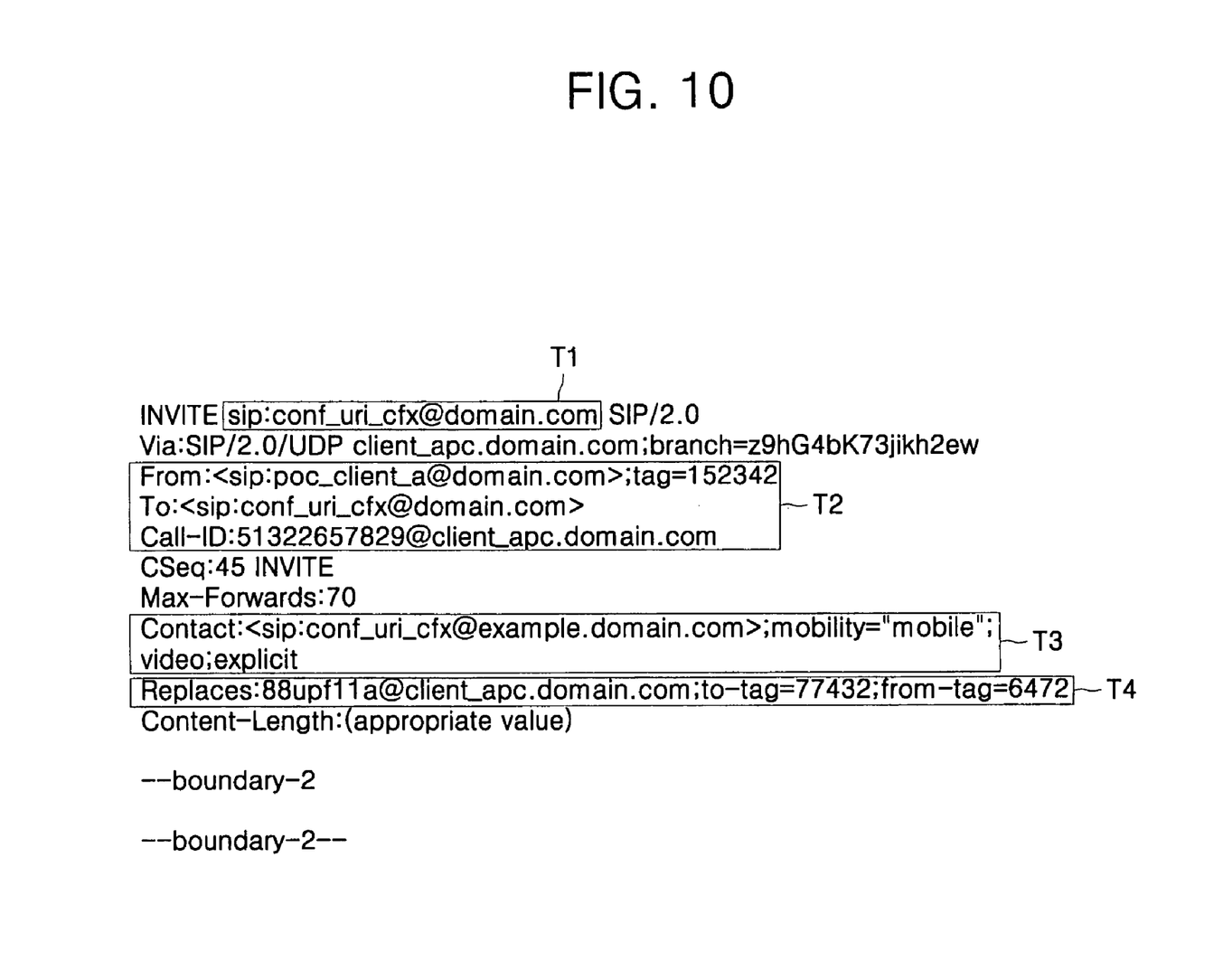
FIG. 10 shows the format of an INVITE message used in the process of FIG. 8.

As shown in FIG. 10, the PoC client A2 1120 transmits corresponding session dialog information through a Replaces header field (T4 of FIG. 10) of the INVITE message in order to replace a session dialog (to be replaced in order to receive media through the same session dialog with respect to the currently running session) which the PoC client A1 1110 puts to use.

The PoC server, the CF 1000, receives a request to connect the session from the PoC client A2 1120, and then returns a 200 OK response (S2301 and S2302). At this time, newly created session dialog information (dialog ID created by transaction in steps S2201 to S2302) is stored in the CF 1000, and it is confirmed that a RTP media stream transmitted through the previous dialog can be transmitted as a new dialog. The PoC client A2 1120 returns an ACK signal with respect to the 200 OK response (S2401 and S2402).

Meanwhile, the CF 1000 transmits the 200 OK response, and simultaneously transmits a talk burst control message notifying transmission of the media to the PoC client A2 1120 (S2501 and S2502). Further, the resulting media stream is transmitted to new PoC client A2 1120 after the 200 OK response is transmitted (S2600 and S2700). At this time, the media is transmitted to the PF A 1100 through the same route, and is routed to the corresponding PoC client A2 1120 after the route of the SIP/IP core network is decided.

Next, the PoC server, the CF 1000, after transmitting the 200 OK message transmits a BYE message for terminating the session to the PoC client A1 1110 in order to terminate unnecessary connection of the session (S2801 and S2802), and confirms the termination of the session by receiving the 200 OK response S2901 and S2902).

Now, the message shown in FIGS. 6, 7, 9 and 10 will be described in full detail.

FIG. 6 shows the format of the REFER message used in the flow diagram of FIG. 5 when the PoC clients A1 and A2 have the same SIP URI.

A Request URI P1 of the REFER message of FIG. 6 is set up as a conference URI that is managed by the CF, and the value of a Refer-To header field P3 is designated as the value of an SIP URI of the PoC client A2 to which the CF makes a request for an INVITE message. At this time, the SIP URI of the Refer-To header field P3 is transmitted including preference (characteristic value) of the PoC user in order to discriminate from the PoC client using the same SIP URI. To this end, the present invention is defined so as to add preference (fixed, mobile, video, explicit etc.) of a PoC session requester, which serves as an URI parameter of the Refer-To header as in FIG. 6.

The PoC client A1 makes use of a Referred-By header field P4 in order to transmit dialog information of a session to which he/she is connected. The Referred-By header field P4 includes SIP URI information of the PoC client A1 and an identity CID of an attached content. The PoC client A1 is adapted to transmit his/her session dialog information through a corresponding MIME body portion P5. When the PoC server, the CF, transmits a new INVITE message using these content identity and dialog information, the CF can use the same session dialog.

FIG. 7 shows the format of the message when the INVITE message is created after the REFER message is received. As discussed above, the preference information of the PoC client which is included in the Refer-To header is used in an Accept-Contact header portion Q3 of the INVITE message, discriminating among the PoC clients having the same SIP URI to act to route the INVITE message. Meanwhile, a Replaces header Q4 includes session dialog information transmitted through the REFER message, and serves to receive media for the same session dialog when the PoC client is replaced.

FIG. 9 shows the format of a REFER message when PoC clients A1 and A2 have the same SIP URI. A Request URI R1 of the REFER message is set up as the SIP URI of a new PoC client, and the value of a Refer-To header field R5 is set up as the value of an SIP URI of the CF in which the PoC clients participate.

Further, for the purpose of routing to the PoC client A2 using the same SIP URI, a preferred user agent characteristic is set up for an Accepted-Contact header R4, and a Refer-To header R5 sets up a type of the message, which the PoC client A2 has to transmit in addition to information on a PoC session identity, as an INVITE message.

Meanwhile, the PoC client A1 makes use of a Referred-By header field R6 in order to transmit dialog information of a session to which he/she is connected. The PoC client A1 is adapted to transmit his/her session dialog information with SIP URI information of the PoC client A1 as well as an identity CID of an attached content included in the Referred-By header field R6. When transmitting a new INVITE message using these content identity CID (denoted by 20398823.2UWQFN309shb3@domain.com) and dialog information (denoted by 88upf11a@client_apc.domain.com; to-tag=7743; from-tag=6472), the PoC client A2 can use the same session dialog.

FIG. 10 shows the format of the message when the INVITE message is created after the REFER message is received. As discussed above, the capability information of the PoC client which is included in the Accepted-Contact header is given to a Contact header T3 of the INVITE message, discriminating from the PoC client A1 using the same SIP URI. Meanwhile, a Replaces header T4 includes session dialog information transmitted through the Referred-By header and MIME body portion of the REFER message, and allows the PoC client A2 to receive media for the same session dialog instead of the PoC client A1.

The present invention is not limited to a PoC system, but it may be applied to all systems where a call is made by request of the call using IMS (IP Multimedia System) Core Network (CN) that is being standardized or completed in the 3GPP (3rd Generation Partnership Project) or 3GPP2 (3rd Generation Partnership Project 2), as well as a half duplex type call.

The present invention as mentioned above enables the target PoC client to be connected to the PoC session instead of the current PoC client by the instruction of the PoC client, instead of the procedure of connecting the session again after the session is terminated.

Therefore, the media is prevented from being transmitted discontinuously, so that the PoC user can be provided with improved service.

Further, the currently busy PoC client can be replaced in the existing busy PoC session using the PoC compliant client capable of connecting the PoC session, so that the transmitted media stream of the running PoC session can be prevented from being lost when the PoC client is replaced.

For this reason, in the situation where it is necessary to replace the PoC terminal according to change of the media for the PoC call, request of mobility, etc., by the PoC user, the user is allowed to make a continuous call. Thus, it is expected to improve QoE of the user and expand the markets for the PoC terminal and its services.

Although exemplary embodiments of the present invention have been described with reference to the attached drawings, the present invention is not limited to these embodiments, and it should be appreciated to those skilled in the art that a variety of modifications and changes can be made without departing from the spirit and scope of the present invention.

What is claimed is:

1. A server method for guaranteeing a seamless session when replacing one of a plurality of terminals as a terminal communicating with a server by request of a particular user having the plurality of terminals, the method comprising the steps of:

receiving a terminal replacement request message from a terminal requesting replacement, the terminal replacement request message for requesting replacement by a terminal to be replaced among the plurality of terminals;

transmitting, by the server, an INVITE message to the terminal to be replaced;

receiving a response message to the INVITE message from the terminal to be replaced;

transmitting media to the terminal to be replaced; and transmitting a session termination request message to the terminal requesting replacement after connecting the session with the terminal to be replaced for transmitting the media to the terminal to be replaced, wherein the terminal replacement request message uses an SIP (Session Initiation Protocol) REFER message including at least one of a conference URI (Uniform Resource Identifier) of the session set as a Request URI and address information of the terminal to be replaced.

2. The method according to claim 1, further comprising the steps of: receiving a response message to the session termination request message from the terminal requesting replacement; and terminating the session with the terminal requesting replacement.

3. The method according to claim 1, further comprising the step of:
discriminating the terminal to be replaced and the terminal requesting replacement using an SIP URI involved in the terminal replacement request message when the address information of the terminal to be replaced and the SIP URI used by the terminal requesting replacement are different from each other,
wherein the address information of the terminal to be replaced included in the Refer-To header field uses an SIP URI that is different from the SIP URI used by the terminal requesting replacement.

4. The method according to claim 1, wherein the address information of the terminal to be replaced included in the Refer-To header field is used without discriminating from an SIP URI used in a current terminal.

5. The method according to claim 1, wherein the REFER message includes session connection information being a session dialog identifier for the terminal to be replaced to seamlessly receive content of the currently running session, and Refer-To header information on the terminal requesting replacement.

6. The method according to claim 5, wherein the Refer-To header information includes the INVITE message for connecting the session with the terminal to be replaced.

7. The method according to claim 6, wherein the INVITE message discriminates between the terminal to be replaced and the terminal requesting replacement of the terminal using the SIP URI when the address information of the terminal to be replaced and the SIP URI used by the terminal requesting replacement of the terminal are used differently from each other.

8. The method according to claim 6, wherein the INVITE message includes session dialog information in a Replaces header field so as to enable the terminal to be replaced to receive media through the same session dialog with respect to the currently running session.

9. A terminal requesting replacement method for guaranteeing a seamless session when replacing one of a plurality of terminals as a terminal communicating with a server by request of a particular user having the plurality of terminals, the method comprising the steps of:
establishing, by a terminal requesting replacement, an established session with the server;
transmitting a terminal replacement request message to a terminal to be replaced, the terminal replacement request message including a unique identity of the session and address information of the terminal to be replaced;
transmitting, by the terminal to be replaced to the server, an INVITE message including information;
receiving, by the terminal to be replaced from the server, a response message to the INVITE message;
receiving, by the terminal to be replaced from the server through the established session, a media; and
receiving, by the terminal requesting replacement, a session termination request message for terminating the established session with the terminal requesting replacement.

10. The method according to claim 9, wherein the terminal requesting replacement transmits the terminal replacement request message for the replacement of the terminal to the terminal to be replaced while maintaining the seamless session.

11. The method according to claim 9, further comprising the step of:
identifying terminals using information on a characteristic value of a Session Initiation Protocol (SIP) user agent when address information of the terminal to be replaced is different from address information used by the terminal requesting replacement of the terminal.

12. The method according to claim 9, wherein the INVITE message additionally includes information on a characteristic value of a user agent which is set up by request of a user.

13. The method according to claim 12, wherein the INVITE message discriminates between the terminal to be replaced and the terminal requesting replacement using a Session Initiation Protocol Uniform Resource Identifier (SIP URI) when the address information of the terminal to be replaced and the SIP URI used by the terminal requesting replacement are used differently from each other.

14. A server for guaranteeing a seamless session when replacing one of a plurality of terminals as a terminal communicating with the server by request of a particular user having the plurality of terminals, the server comprising:
a device for receiving a terminal replacement request message from a terminal requesting replacement, the terminal replacement request message for requesting replacement by a terminal to be replaced among the plurality of terminals;
a device for transmitting an INVITE message to the terminal to be replaced;
a device for receiving a response message for the INVITE message from the terminal to be replaced or for receiving an INVITE message including information on an existing session from the terminal to be replaced;
a device for transmitting media to the terminal to be replaced; and
a device for transmitting a session termination request message to the terminal requesting replacement after connecting the session with the terminal to be replaced for transmitting the media to the terminal to be replaced,
wherein the terminal replacement request message uses a Session Initiation Protocol (SIP) REFER message including at least one of a conference Uniform Resource Identifier (URI) of the session set as a Request URI and address information of the terminal to be replaced.

15. The server according to claim 14, further comprising:
a device for discriminating the terminal to be replaced and the terminal requesting replacement using the SIP URI involved in the terminal replacement request message when the address information of the terminal to be replaced and the SIP URI used by the terminal requesting replacement are different from each other,
wherein the address information of the terminal to be replaced included in a Refer-To header field uses an SIP URI that is different from the SIP URI used by the terminal requesting replacement.

16. The server according to claim 14, further comprising:
a device for identifying terminals using information on a characteristic value of an SIP user agent when address information of the terminal to be replaced is used without discriminating from the SIP URI used by the terminal requesting replacement.

17. The server according to claim 14, further comprising:
a device for establishing a session with a terminal requesting replacement.

18. A method of a terminal for guaranteeing a seamless session when replacing one of a plurality of terminals as a terminal communicating with a server by request of a particular user having the plurality of terminals, the method comprising the steps of:
transmitting, by a terminal requesting replacement, a terminal replacement request message to the server;
receiving, by terminal to be replaced from the server, a response to the terminal replacement request message;
receiving, by the terminal to be replaced from the server, an INVITE message including information;
transmitting, by the terminal to be replaced to the server, a response message to the INVITE message;
receiving the media from the server; and
receiving a session termination request message from the server after connecting the session with the terminal to be replaced for transmitting the media to the terminal to be replaced.

19. The method according to claim 18, wherein the terminal replacement request message uses a Session Initiation Protocol (SIP) REFER message including a conference Uniform Resource Identifier (URI) of the session set as a Request URI, and address information of the terminal to be replaced set in a Refer-To header field.

20. The method according to claim 18, further comprising the step of:
receiving the session termination request message to terminate the session when a process of replacing the terminal is terminated by the server.

21. The method according to claim 18, wherein the INVITE message discriminates between the terminal to be replaced and the terminal requesting replacement of the terminal using an SIP URI when the address information of the terminal to be replaced and the SIP URI used by the terminal requesting replacement are used differently from each other.

22. A terminal for guaranteeing a seamless session when replacing one of a plurality of terminals as terminal communicating with a server by request of a particular user having the plurality of terminals, the terminal comprising:
a device for establishing a session with the server;
a device for transmitting a terminal replacement request message to a terminal to be replaced, the terminal replacement request message including a unique identity of the session and address information of the terminal to be replaced;
a device for receiving the terminal replacement request message from a terminal requesting replacement;
a device for transmitting, by the terminal to be replaced to the server, an INVITE message including information:
a device for receiving, by the terminal to be replaced from the server, a response message of the INVITE message; and
a device for receiving a session termination request message for terminating the session with the terminal requesting replacement.

23. The terminal according to claim 22, wherein the terminal replacement request message uses a Session Initiation Protocol (SIP) REFER message including a conference Uniform Resource Identifier (URI) of the session set as a Request URI, and address information of the terminal to be replaced set in a Refer-To header field.

24. The terminal according to claim 22, further comprising:
a device for receiving a session termination request message to terminate the session when a process of replacing the terminal is terminated by the server.

25. The terminal according to claim 22, wherein the INVITE message discriminates between the terminal to be replaced and the terminal requesting replacement of the terminal using an SIP URI when the address information of the terminal to be replaced and the SIP URI used by the terminal requesting replacement are used differently from each other.

* * * * *